3,147,315
HEAT-STABILIZED CHLOROSULFONATED POLY-
ETHYLENE CONTAINING AN EPOXY COM-
POUND AND A PHENOL
Royce Elton Ennis and Louis Henry Knabeschuh, Beaumont, Tex., assignors to E. I. du Pont de Nemours and Company, Wilmington, Del., a corporation of Delaware
No Drawing. Filed May 16, 1961, Ser. No. 110,354
6 Claims. (Cl. 260—837)

This invention relates to the heat stabilization of elastomers and more particularly elastomers of chlorosulfonated polymers of ethylene.

Chlorosulfonated polyethylene, an important commercial elastomer, is ordinarily made by treating a dilute solution of polyethylene in carbon tetrachloride with chlorine and sulfur dioxide. See, for example, U.S. Patent 2,586,363, of McAlevy. The product can be isolated by removing the solvent by steam distillation. When producing chlorosulfonated polyethylene on a large scale, however, many separate steps are generally required; including the steam distillation; the condensation, separation and drying of the recovered solvent; and the filtration and drying of the polymer. The chlorosulfonated polyethylenes, while remarkably resistant to heat, oxygen, ozone and weathering conditions, have been found to undergo some alteration even in the presence of stabilizers when the product is exposed to air and water at elevated temperatures. The alteration in properties may occur during manufacture or when in use. A new process which largely or completely avoids the degradation of chlorosulfonated polyethylene is described in assignee's Kalil U.S. Patent 2,923,979. During the Kalil process for isolating chlorosulfonated polyethylene from its carbon tetrachloride solution, particles of the elastomer are sometimes accidentally held up within the apparatus and are subjected for a considerable period of time to a drying temperature in the range of 100 to 200° C. The particles become discolored forming dark masses, which when they finally become dislodged, are released into the stream of dried product thereby contaminating it. Certain stabilizing compounds, e.g., those containing the epoxy group, have been added to the solvent solution containing the chlorosulfonated polyethylene to retard the discoloration. It has been found, however, that the epoxy compounds do not retard the discoloration to the desired extent.

It is an object of the invention to provide a heat-stabilized chlorosulfonated polymer of ethylene. Another object is to provide such a heat-stabilized polymer which contains an epoxy compound and a substituted phenol. A further object is to provide such a polymer wherein discoloration due to elevated temperatures is essentially eliminated. Still further objects will be apparent from the following description.

The above and other objects are accomplished by providing a heat-stabilized chlorosulfonated branched-chain polymer of ethylene having a density of 0.910 to 0.925 and a molecular weight of 10,000 to 1,000,000 before chlorosulfonation, and containing 0.5 to about 3% by weight of an epoxy compound containing two epoxy groups per molecule and having a molecular weight of 300 to 1000, and 0.1 to about 2.0% by weight of a substituted phenol having tertiary alkyl groups of not more than 10 carbon atoms each on the carbon atoms adjacent the carbon atom bearing the hydroxyl group. The epoxy compound is preferably present in an amount of 0.8 to 1.2% by weight, and the phenolic compound is preferably present in the polymer in an amount of 0.5 to 1% by weight based on the weight of chlorosulfonated polymer.

The epoxy compounds (resins) and the phenols used as stabilizers are incorporated in the chlorosulfonated polyethylene by dissolving them in the carbon tetrachloride solvent solution which is used to prepare the chlorosulfonated polyethylene elastomer. The elastomers are then isolated by evaporating the solvent, preferably by the method described in U.S. Patent 2,923,979, referred to above, a colorless, porous, translucent heat-stable film being obtained. In practice, the film is usually gathered and compressed into a continuous rope-like structure which can then be placed in a more useful form such as shorter lengths or chips.

The invention will be further illustrated by but is not intended to be limited to the following example:

EXAMPLE I

An amount of an epoxy compound prepared by condensing one mole of 2,2-propane bis(4-hydroxyphenyl) and 2 moles of epichlorohydrin and/or an amount of a phenolic compound (phenol A being 2,6-ditertiary butyl-4-phenylphenol and phenol B being 2,6-ditertiary butyl-4-cresol) are (is) dissolved in a solution of carbon tetrachloride containing 10% by weight of a chlorosulfonated branched-chain polymer of ethylene having a density of 0.915 and a molecular weight of about 20,000 before chlorosulfonation, to give the proportions set forth in the following table which are based on the weight of elastomer present. The chlorosulfonated polymer contains 27% by weight chlorine and 1.25% by weight sulfur. Evaporation of the solvent at room temperature from shallow pans gives uniform, transparent films which are tested by exposure in air for 6 hours at 150° C. and then rated for their degree of discoloration. The degree of discoloration is represented as follows:

(1) very light tan
(2) light tan
(3) tan
(4) brown
(5) dark brown

Table

STABILIZERS IN ELASTOMER

| Sample | Epoxy Compound | Phenol | Degree of Discoloration |
|---|---|---|---|
| 1 | None | None | 5 |
| 2 | 2% by weight | None | 4 |
| 3 | None | 1% by weight of A | 3 |
| 4 | None | 1% by weight of B | 3 |
| 5 | 1% by weight | 0.5% by weight A | 1 |
| 6 | 1% by weight | 0.5% by weight B | 1 |
| 7 | 2% by weight | 0.5% by weight A | 1 |

It is seen from the table that the combination of the epoxy resin and either phenol A or B gives a much greater effect (synergistic) than the amount of either compound when used alone. It is noted in sample 7 that an increase in the amount of epoxy compound above 1% by weight in the mixture gives essentially no additional stabilizing effect.

The following compounds are illustrative of the epoxy compounds and phenols that can be used in this invention to give results comparable to those of the example.

*Epoxy compounds.*—The condensation product of one mole of 2,2-propane bis(4-hydroxyphenol) with four moles of epichlorohydrin and the condensation product of one mole of hydroquinone with two moles of epichlorohydrin.

*Phenols.*—2,6-ditertiary butyl-4-paratertiary butylphenol, 2,6-ditertiary amyl-4-cresol, 2,6-ditertiary octyl-4-cresol, and 2,6-ditertiary butyl-4-(paratertiary butylphenyl)phenol.

The chlorosulfonated polymers of ethylene useful in this invention are those derived from chlorosulfonated branched-chain type polyethylenes of a density of 0.910 to 0.925. The chlorosulfonated polyethylenes are generally made by means of free-radical catalysts by the procedures described in U.S. Patents 2,405,971 and 2,586,363. Suitable free-radical catalysts include peroxides such as benzoyl peroxide and other peroxides set forth in U.S. Patent 2,405,971 and azo compounds such as α,α'-azo-diisobutyronitrile. Chlorosulfonated polymers of ethylenes of a density above 0.925, made, for example, at relatively low pressures by means of coordination catalysts, e.g., titanium tetrachloride with an aluminum trialkyl, have been found to be less affected by heat and are adequately stabilized by the use of an epoxy compound of the types described below. The chlorosulfonated branched-chain polyethylene most suitable in the preparation of the heat-stabilized polymer contains about 20 to about 45% by weight chlorine and 0.4 to 3% by weight sulfur, the sulfur being in the form of $SO_2Cl$ groups.

The epoxy compounds (or resins) useful in this invention are those having a molecular weight of 300 to 1000 and are made from epihalohydrins and dihydric phenols by the procedures described in U.S. Patents 2,324,483; 2,444,333; 2,494,295; 2,500,600 and 2,511,913. Epoxy compounds of the lowest useful molecular weight are made by condensing at least two moles of epihalohydrin and one mole of polyhydric phenol. The higher molecular weight epoxy compounds are prepared by increasing the mole ratio of polyhydric phenol to epihalohydrin. The required two epoxy groups per molecule are obtained provided the ratio of epichlorohydrin to polyhydric phenol is greater than one.

The phenolic stabilizing compounds, sometimes called highly hindered phenols, can be made by reacting isobutylene and its homologs with whenols having the two positions ortho to the hydroxyl carbon atom unsubstituted and the paraposition preferably substituted, e.g., with alkyl groups of 1 to 10 carbon atoms including tertiary alkyl groups, aryl groups, aralkyl groups, etc. The reaction for preparing the substituted phenols is well known and a suitable procedure is described in U.S. Patent 2,051,473. Concentrated sulfuric acid is commonly used as the catalyst. Suitable tertiary alkyl groups substituted in the ortho positions include tertiary butyl, tertiary amyl, 1,1-dimethyl hexyl, triethyl methyl, etc. Those with 4 to 6 carbons are particularly preferred.

As indicated above, the quantitites of the stabilizing agents range from 0.5 to 3.0% by weight of the epoxy compound and 0.1 to 2.0% by weight of the substituted phenol based on the weight of elastomer. It has been found that as the amount of stabilizer is decreased, the stabilization against discoloration is also proportionately decreased. If the amount of the stabilizer is increased above the indicated limits, however, correspondingly greater effects are not achieved. Amounts of stabilizer within the preferred range are most desirable because good results are obtained at a minimum cost for raw materials.

The heat-stabilized chlorosulfonated polymer of ethylene is useful as an uncured, i.e., unvulcanized, elastomer capable of being converted to a vulcanized rubbery material which does not have the undesirable characteristics of cured natural rubber (e.g., unsatisfactory aging properties, sensitivity to deterioration by contact with solvents and by chemical attack, etc.). In addition, the polymer is particularly well stabilized against discoloration due to exposure to elevated temperatures. The heat-stabilized polymer is also useful in the preparation of latices and of solutions in organic solvents which are useful as lacquer and paint vehicles. Such latices and solutions are also useful for making self-supporting films, for impregnation of paper, cloth or other porous materials and for coating of surfaces. The coated articles because of their resistance to ozone are useful outdoors or near electrical equipment.

An advantage of this invention is that a heat-stable chlorosulfonated branched-chain polymer of ethylene can be obtained by adding to the solvent solution in the presence of the polymer small amounts of certain epoxy compounds and substituted phenols. It is believed surprising that a synergistic effect is achieved by adding both the epoxy compound and the phenol as stabilizers. Another advantage of this invention is that the polymer product is extremely well stabilized against discoloration. Still other advantages and uses will be apparent to those skilled in the art.

The embodiments of the invention in which an exclusive property or privilege is claimed are defined as follows:

1. A heat-stabilized chlorosulfonated branched-chain polyethylene having a density before chlorosulfonation of 0.910 to 0.925, having blended therewith: (A) from about 0.5 to about 3% by weight of an epoxy compound containing two epoxy groups per molecule and having a molecular weight of 300 to 1000, and (B) from about 0.1 to about 2.0% by weight of a para-substituted phenol having tertiary alkyl groups of not more than 10 carbon atoms each on the carbon atoms adjacent the carbon atom bearing the hydroxyl group.

2. A heat-stabilized chlorosulfonated polyethylene as defined in claim 1 wherein the epoxy compound is present in an amount of 0.8 to 1.2% by weight and the phenolic compound is present in an amount of 0.5 to 1.0% by weight.

3. A heat-stabilized chlorosulfonated polyethylene as defined in claim 1 wherein said chlorosulfonated polyethylene contains 20 to 45% by weight chlorine and 0.4 to 3.0% by weight sulfur.

4. A heat-stabilized chlorosulfonated polyethylene as defined in claim 1 wherein said epoxy compound is the condensation product of one mole of 2,2-propane bis(4-hydroxyphenyl) and 2 moles of epichlorohydrin.

5. A heat-stabilized chlorosulfonated polyethylene as defined in claim 1 wherein said phenol is 2,6-ditertiary butyl-4-phenylphenol.

6. A heat-stabilized chlorosulfonated polyethylene as defined in claim 1 wherein said phenol is 2,6-ditertiary butyl-4-cresol.

References Cited in the file of this patent

UNITED STATES PATENTS

| | | |
|---|---|---|
| 2,723,255 | Busse et al. | Nov. 8, 1955 |
| 2,879,261 | Johnson et al. | Mar. 24, 1959 |
| 2,951,052 | Darby | Aug. 30, 1960 |